United States Patent [19]

Suzuki

[11] Patent Number: 5,406,492
[45] Date of Patent: Apr. 11, 1995

[54] DIRECTIONAL VOICE-TYPE NAVIGATION APPARATUS

[75] Inventor: Seiichi Suzuki, Tokyo, Japan

[73] Assignee: Kabushikaisha Equos Research, Tokyo, Japan

[21] Appl. No.: 160,785

[22] Filed: Dec. 3, 1993

[30] Foreign Application Priority Data

Dec. 4, 1992 [JP] Japan .................................. 4-350655

[51] Int. Cl.$^6$ ........................ G06F 15/50; G01C 21/00
[52] U.S. Cl. .................................... 364/449; 340/996; 381/86
[58] Field of Search ............... 364/444, 449, 565, 436; 340/995, 996; 342/357, 457; 381/86

[56] References Cited

U.S. PATENT DOCUMENTS

| | | | |
|---|---|---|---|
| 4,274,560 | 12/1993 | LaRue | 364/444 |
| 4,393,270 | 7/1983 | Van Den Berg | 179/1 D |
| 4,679,147 | 7/1987 | Tsujii et al. | 364/449 |
| 4,866,776 | 9/1989 | Kasai et al. | 381/24 |
| 4,937,751 | 6/1990 | Nimura et al. | 364/449 |
| 5,172,321 | 12/1992 | Ghaem et al. | 364/444 |
| 5,177,685 | 1/1993 | Davis et al. | 364/443 |
| 5,305,386 | 4/1994 | Yamato | 381/1 |

Primary Examiner—Michael Zanelli
Attorney, Agent, or Firm—Sandler, Greenblum & Bernstein

[57] ABSTRACT

A voice-type navigation apparatus is disclosed for giving voice instructions regarding a route to be taken by a vehicle. The instructions are indicated by an audible voice. A memory is provided for storing various voice data for guiding a driver to maintain a route to be traveled by the vehicle. A voice data selection device is provided to select voice data from the memory according to the routes to be maintained. A voice output device audibly outputs the voice data selected by the voice data selection device so that a driver perceives that an audible voice is coming from a particular direction with reference to the driver. The particular direction is determined in accordance with the content of the selected voice data which represents the instruction to be given to the driver regarding the route to be taken by the vehicle.

19 Claims, 4 Drawing Sheets

| CODE No | VOICE CONTENT | OPERATION | TONE VOLUME |
|---|---|---|---|
| 0011 | RIGHT DIRECTION | RIGHT FORWARD | NORMAL LEVEL |
| 0012 | LEFT DIRECTION | LEFT FORWARD | NORMAL LEVEL |
| 0013 | 500m | —— | NORMAL LEVEL+10 |
| 0014 | 100m | —— | NORMAL LEVEL+15 |
| 0015 | 50m | —— | NORMAL LEVEL+20 |
| 0016 | PASS | BACKWARD | NORMAL LEVEL |

DIRECTIONAL VOICE-TYPE NAVIGATION APPARATUS

BACKGROUND OF THE INVENTION

1. Field of the Invention

The present invention relates to a navigation apparatus for a vehicle. More particularly, the present invention is directed to a voice output device of a voice navigation apparatus for improving the rate at which audible navigation instructions can be recognized by a driver while the driver is navigating a vehicle.

2. Discussion of Background Information

Conventional navigation apparatus have provided navigation instructions to a driver, when the driver is driving to a desired destination. Such navigation apparatus give instructions as to the correct route, so that the driver can properly navigate to a particular destination even though the driver is unfamiliar with the locality within which he or she is driving the vehicle. Several recent developments have been made of such navigation apparatus. Navigation apparatus have been provided which display a destination route, and which give instructions concerning the traveling direction to be taken at each spot, as necessary for navigation of the vehicle to the intended destination. The instructions are displayed on a display device such as a CRT display. The driver observes route information by viewing the display device as needed.

A disadvantage associated with such display-type navigation apparatus is that the driver must take his or her eyes away from the road in order to view the display in order to obtain routing information as needed. In order for the driver to confirm whether he or she is going in the right direction without being distracted from driving the vehicle, the driver must glance at the information on the display very quickly. However, a mere quick glance at the display may not be a satisfactory amount of time for the driver to sufficiently recognize and understand navigation instructions given by the navigation apparatus. Should the driver stop the vehicle in order to observe the display, the driver will delay the amount of time it takes to reach the intended destination. Repeated stops of the vehicle along the way will cause a large loss in time in reaching the destination.

In order to address the above-noted problems, voice navigation apparatus have provided voice navigation instructions, in addition to displayed navigation instructions, displayed on, e.g., a CRT display. More specifically, voice navigation apparatus have been provided with a loudspeaker for outputting voice instructions. The loudspeaker may be configured such that, for example, when it is determined that the vehicle should turn to the right at the next intersection, the loudspeaker will sound the words "turn to the right at the next intersection."

By the use of a voice navigation apparatus, the driver can audibly obtain route information without taking his or her eyes off the road in order to view a display. Thus, the driver can easily recognize navigation instructions audibly. However, when a driver has not completely recognized a voiced instruction sounded by a voice navigation apparatus, or when a driver forgets an instruction, the driver will not recognize the instruction's content and thus will be inconvenienced. In today's high-speed and complicated traffic situations, quick decisions are essential to proper and safe driving. If a driver fails to understand or fails to hear an audibly indicated routing instruction, the driver may miss an intersection, and thus may depart from the proper route to the intended destination. Thus, it is important in voice navigation apparatus that the driver can quickly recognize the content of the instructions with only one voiced instruction.

SUMMARY OF THE INVENTION

In view of the above, it is an object of the present invention to provide a voice navigation apparatus which allows the driver to quickly and accurately recognize the content of voice instructions issued by the voiced navigation apparatus. The voice instructions may include, e.g., a route instruction for a vehicle, issued by a sounding of a loudspeaker.

It is a further object of the present invention to provide a voice navigation apparatus which orients an acoustic image of an output voice, at a predetermined position, so that an instruction can be conveyed to the vehicle driver more efficiently.

The present invention, therefore, is directed to a voice navigation apparatus used for routing instructions to a vehicle driver, which comprises various features related to the sounding of voice instructions in such a fashion that a driver of the vehicle can quickly and accurately recognize routing information.

In accordance with a particular aspect, the present invention is directed to a navigation apparatus for giving instructions regarding a route to be taken by a vehicle. The instructions are indicated as an audible voice. The apparatus comprises a first memory device, a voice data selection device, and a voice output device. The first memory device stores various voice data for guiding a driver along a route to be traveled by the vehicle. The voice data selection device selects, from the first memory device, voice data according to a route to be traveled. The voice output device audibly outputs the voice data selected by the voice data selection device from a location that corresponds to a content of the selected voice data.

In accordance with a further aspect of the invention, the apparatus may also be provided with a current position detection device for detecting the current position of the vehicle. In addition, an input device may be provided for inputting a destination, a second memory device may be provided for storing map data, and a route determining device may be provided for determining a route that leads to the destination input by the input device. The determining device determines the route on the basis of the current position detected by the current position detection device and the map data stored in the second memory device. The voice data selection device selects voice data from the first memory device in accordance with the route determined by the route determining device.

The voice output device may comprise voice output members arranged at a plurality of positions. Each of the voice output members outputs a voice message. The voice output device may further comprise a device for modifying the message output by the voice output members, so that a voice message is output at one or more particular positions with respect to the driver of the vehicle in a manner which corresponds to a direction in which the vehicle is being guided.

The current position detection device may include at least one of a GPS sensor, a vehicle speed sensor, a geomagnetic sensor, a steering sensor and a beacon receiver. In addition, the content of the selected voice data may include an instruction to change a route of the vehicle. In this regard, the voice output device audibly outputs the voice data when the vehicle is at a position which is a predetermined distance before reaching a location at which the direction of movement of the vehicle is to be changed. The voice output device may further output voice data corresponding to a route to be traveled a plurality of times for each instruction given by the navigation apparatus.

In accordance with a further aspect of the invention, the voice output device outputs voice data to form an acoustic image that causes a driver of the vehicle to perceive that sound is coming from a particular direction that corresponds to the direction to be taken by the vehicle in continuing along the route of the vehicle. In accordance with a further aspect of the invention, the content of the selected voice data includes an instruction for the vehicle to change directions along the route, and the voice output device outputs voice data in a manner that creates an acoustic image which causes a driver of the vehicle to perceive that sound is coming from the position that corresponds to a direction in which the vehicle is instructed to be driven.

In accordance with yet a further aspect of the present invention, the voice output device creates an acoustic image causing the driver to perceive that sound is coming from the position that corresponds to the direction in which the vehicle is instructed to be driven along the route of the vehicle. In this regard, the perceived position from which the sound is coming is changed as the vehicle travels, so that the direction from which the sound is perceived to come and the perceived distance from the perceived sound to the driver change as the vehicle position changes.

The apparatus as discussed above may further comprise a vehicle speed detection device for detecting a speed of the vehicle, and a direction detection device for detecting a direction in which the vehicle is being navigated. In this regard, the voice output device creates an acoustic image based upon the voice data in accordance with a vehicle speed detected by the vehicle speed detection device, and further in accordance with the direction detected by the direction detection device. The direction detection device may comprise a steering sensor, and may further comprise a device for detecting the direction in which the vehicle is moving based upon a steering amount of the vehicle as detected by the steering sensor and further based upon a relative angle at which the vehicle is moving with respect to a direction in which the vehicle is traveling before the vehicle has changed its direction.

In accordance with a further aspect, the present invention is directed to a voice-type navigation apparatus for providing instructions to a driver of the vehicle. The instructions include audible utterances of directions to the driver regarding a direction in which the vehicle should be driven when the vehicle reaches a next reference position. A memory device is provided for storing data representative of voice utterances of direction instructions. A selection device is further provided for selecting various words from the voice utterances stored in the memory device in accordance with a direction in which the vehicle should be driven by a driver of the vehicle when the vehicle reaches a next reference location. In addition, a voice output device is provided for audibly outputting one or more of the words selected by the selection device. In this regard, the voice output device audibly outputs the one or more words at one or more locations with respect to the driver, and the one or more locations are chosen and arranged as a function of the direction given by the selected words.

This application is related to Japanese Patent Application No. 350,655/1992, filed Dec. 4, 1992, the disclosure of which is expressly incorporated herein by reference in its entirety.

BRIEF DESCRIPTION OF THE DRAWINGS

The present invention is further described, along with other objects and merits of the present invention, by reference to several noted drawings by way of non-limiting examples of preferred embodiments of the present invention, wherein.

DETAILED DESCRIPTION OF THE PREFERRED EMBODIMENTS

Figure 1:
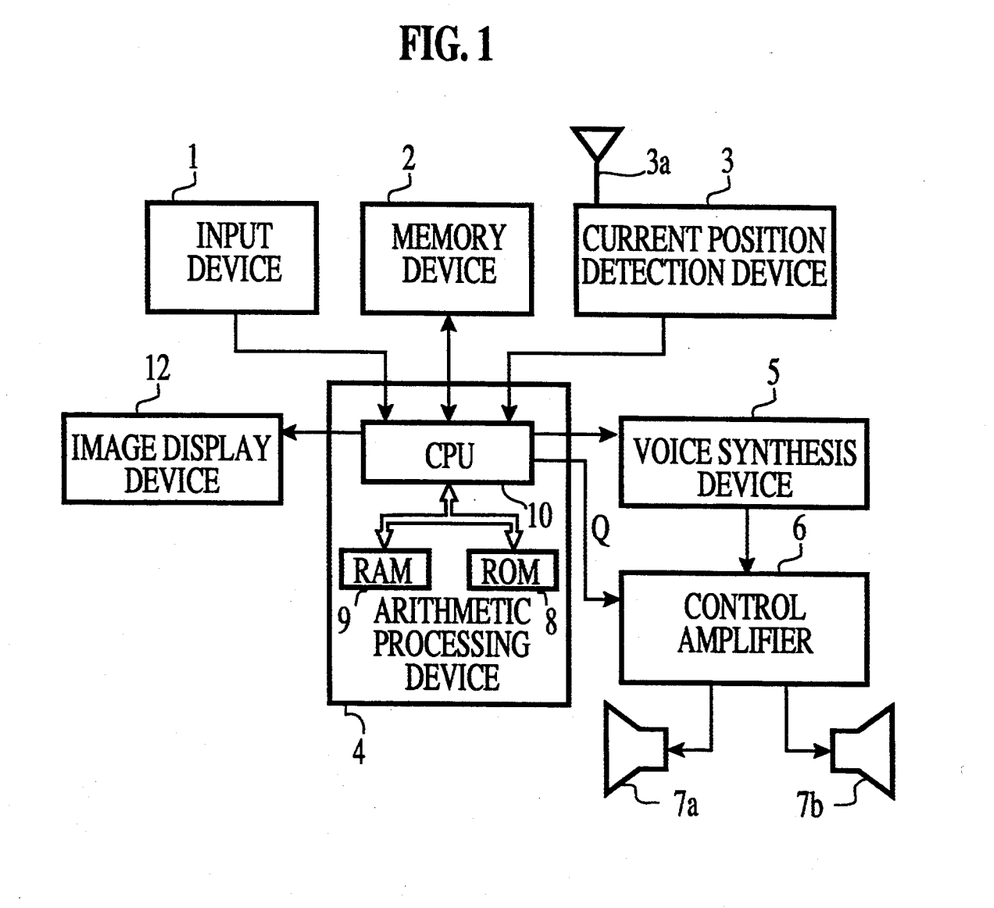
FIG. 1 is a block diagram illustrating the overall arrangement of a voice navigation apparatus according to a first embodiment of the present invention.

Referring now to the drawings in greater detail, FIG. 1 shows the overall arrangement of a voice navigation apparatus according to a first embodiment of the present invention. As shown in FIG. 1, the voice navigation apparatus depicted therein comprises an arithmetic processing device 4, an input device 1, a memory device 2, a current position detecting device 3, an image display device 12, a voice synthesis device 5, and a control amplifier 6. Each of the above-noted elements, including input device 1, memory device 2, current position detecting device 3, image display device 12, voice synthesis device 5, and control amplifier 6, is connected to arithmetic processing device 4 via various interfaces. Right and left loudspeakers 7b and 7a are also provided, each connected to control amplifier 6 via a respective speaker line.

Input device 1 is used for inputting position information including, e.g., an intended destination, the current position of the vehicle, and the like, and comprises a touch panel for inputting information by directly touching a display unit, provided, e.g., within display device 12, or by touching a keyboard (not shown).

Memory device 2 stores road information including, e.g., map data, intersection data, a destination list, and the like, which are necessary to navigate (i.e., to perform route navigation). Memory device 2 may comprise, e.g., a CD-ROM, an IC card, or the like.

Current position detection device 3 comprises a receiver (not shown) for receiving a radio wave from a beacon (not shown), arranged in a GPS (Global Position System) satellite or, in the alternative, arranged on a road. Additionally, current position detection device 3 may comprise various bearing sensing mechanisms (not shown), such as an optical gyro sensor, a geomagnetic sensor, and the like. Current position detection device 3 may also comprise several elements also not shown in the drawings, including a vehicle speed sensor, a wheel sensor, a steering sensor, and the like. The current position detecting device 3 determines the current (absolute) position of the vehicle, in terms of coordinates representative of the longitude and latitude of the vehicle. Current position detection device 3 mainly utilizes a GPS receiver in order to determine the absolute position of the vehicle, and performs position determinations with high precision in combination with data concerning the actual traveling distance and the bearing of the vehicle as detected by various sensors. In FIG. 1, reference numeral 3a denotes an antenna of the receiver (not shown). Antenna 3a may include several antennas with at least one located at a front position of the vehicle and another located at a rear position of the vehicle. The antennas may be positioned in this manner in order to improve the precision of the GPS receiver (not shown) within current position detection device 3.

Arithmetic processing device 4 makes various decisions necessary for navigating the vehicle (i.e., performing route navigation) based upon various data which is received from input device 1, memory device 2, and current position detection device 3. Arithmetic processing device 4 comprises a CPU (Central Processing Unit) 10 for performing functions such as route calculation and deciding what travel direction should be taken. In addition, a ROM (Read-Only Memory) 8 and a RAM (Random Access Memory) 9 are also provided, connected to CPU 10 via a bus line that includes, e.g., a data bus. ROM 8 stores various programs (navigation programs) and data that is necessary for CPU 10 to calculate the route and to decide the traveling direction. RAM 9 comprises a working memory for storing various data such as the results of the route calculation and the decided traveling direction.

CPU 10 confirms what the current position of the vehicle is based upon coordinate data received from current position detection device 3, map data received from memory device 2, and other pertinent information, and determines a route to a destination in accordance with a navigation program stored in ROM 8. In addition to determining the route for the destination, CPU 10 also decides navigating directions for the vehicle. The navigation directions decided by CPU 10 are supplied to image display device 12 and are further supplied to voice synthesis device 5, so that each of these I/O devices can provide an instruction indication concerning, e.g., the traveling direction, to the driver.

CPU 10 also determines the output balance between the right and left loudspeakers 7b and 7a in accordance with the travel directions decided by CPU 10. Based upon the determined balance between the loudspeakers, an appropriate control signal is supplied to control amplifier 6.

Confirmed current position data, calculated route data, map data from memory device 2, and the like, are also supplied from CPU 10 to image display device 12. The image display device 12 may comprise a CRT display, a liquid crystal display, or the like. Display device 12 displays a road map which is formed based upon map data and other related information provided from CPU 10, and further displays the current position of the vehicle also based upon information provided from CPU 10. In addition, display device 12 displays the route that is calculated by CPU 10, and displays a destination list, and other pertinent information, as a result of information acquired from memory device 2.

During processing by arithmetic processing device 4, e.g., while confirming the current position of the vehicle, setting a destination, and performing other processing functions, various data is loaded from memory device 2 into arithmetic processing device 4. When new information, such as new road information, is obtained, e.g., when the beacon receiver receives information regarding a new current position from position detection device 3, the new information is written from arithmetic processing device 4 into memory device 2.

Voice synthesis device 5 comprises a voice synthesis device of the so-called record/edit type. That is, voice synthesis device 5 stores units of audio information including, e.g., words and clauses such as "at the next intersection", "right", and "to the", and edits these words and clauses by combining the words and clauses to form messages such as, e.g., the message "turn to the right at the next intersection". The words and clauses are combined (i.e., edited) based upon an instruction signal given by CPU 10, and a resulting instruction voice is thereby synthesized by voice synthesis device 5. The synthesized voice signal is supplied by control amplifier 6 which amplifies the appropriate signals and forwards the same to its appropriate speaker 7a, 7b.

Control amplifier 6 has speaker lines respectively connected to right and left loudspeakers 7b and 7a, and adjusts the output balance between these lines in accordance with a control signal forwarded from CPU 10. Upon receipt of the voice signal from the voice synthesis device 5, control amplifier 6 divides the received signal into signals to be forwarded over the respective speaker lines, and amplifies the divided signals using a power amplifier unit (not shown) on the basis of the adjusted right/left balancing. Control amplifier outputs the voice signals to the right and left loudspeakers 7b and 7a via their corresponding lines.

The right and left loudspeakers 7b and 7a are used to output voice signals in the form of instruction voices, and are audibly arranged at right and left positions of the driver of the vehicle. The right and left loudspeakers 7b and 7a may comprise, e.g., loudspeakers of a car audio system.

Figure 2:
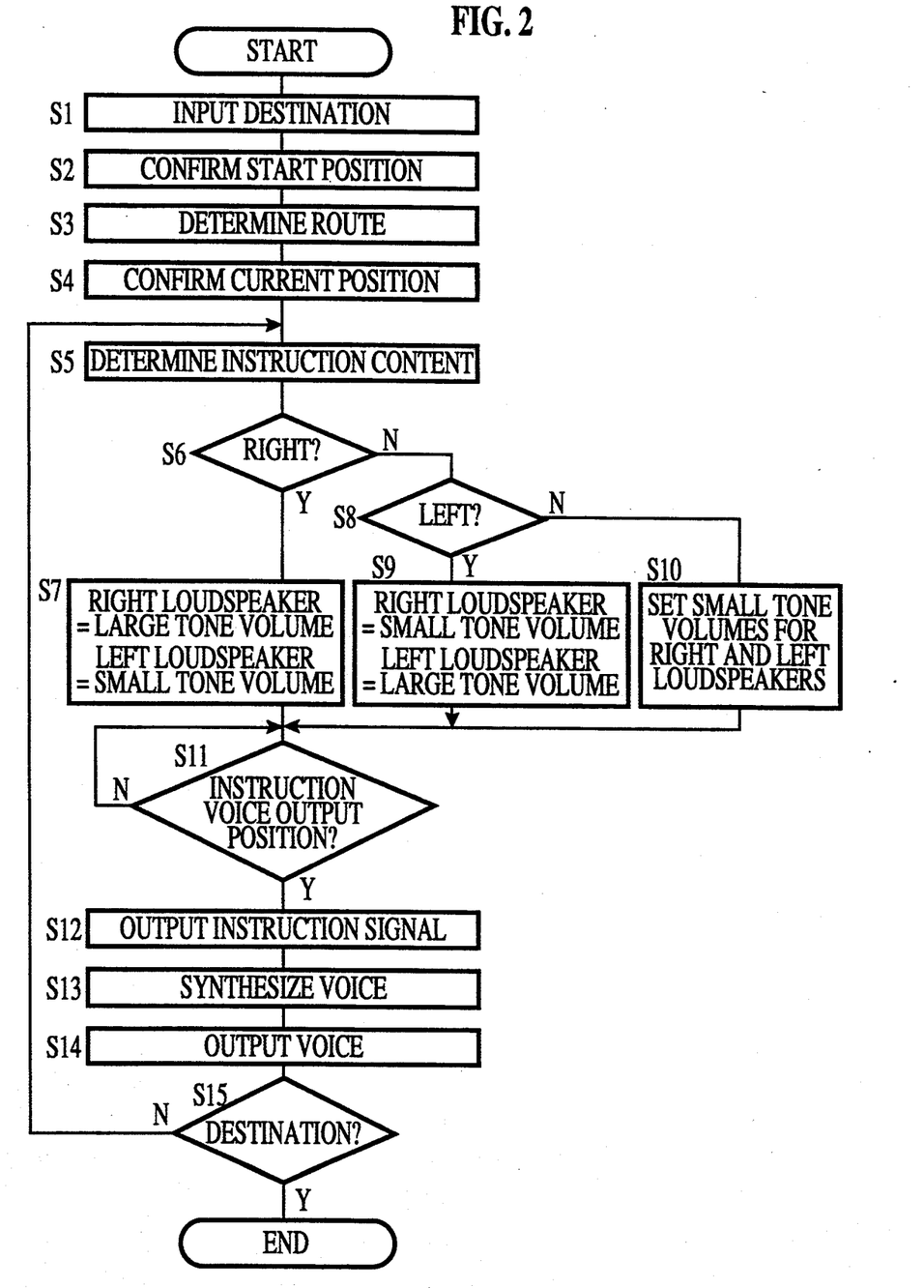
FIG. 2 is a flow chart showing a voice output operation of the voice navigation apparatus.

The operation of the voice navigation apparatus illustrated in FIG. 1 will now be described by reference to FIG. 2. FIG. 2 illustrates a flow diagram representing the operation of a voice navigation apparatus such as that shown in FIG. 1, when performing a route navigation operation. It is noted that the image output operation performed by an image display device 12 (FIG. 1) is not depicted in FIG. 2. However, image display unit 12 appropriately displays guidance information such as information indicative of the appropriate routes to a destination, direction instructions, and the like, even though such steps are not referred to in FIG. 2.

In step S1, a driver inputs the destination using input device 1 (via a touch panel, a keyboard, or the like). When performing step S1, CPU 10 of arithmetic processing device 4 specifies the position of the input destination in terms of the map data stored in memory device 2, and stores the specified position in RAM 9.

In step S2, the driver manually inputs the current position (i.e., the starting position) using input device 1, or, in the alternative, the GPS receiver (not shown) located within current position detection device 3 detects the starting absolute position of the vehicle. CPU 10 thus confirms the current position (i.e., a starting position), in step S2. The confirmed current position of the vehicle is displayed, on image display device 12, as a position on the map formed on the display based upon the above-mentioned map data.

In step S3, CPU 10 determines a route to the destination based upon the current position data, and the above-mentioned destination data, with the use of various programs stored in ROM 8. This route is also displayed on the map displayed by image display device 12.

After the route to the destination is determined in step S3, and the vehicle begins to move, in step S4, CPU 10 confirms the road and position at which the vehicle is currently traveling based upon the coordinate data determined by the GPS receiver (not shown) and various sensors (not shown) of current position detection device 3, along with map data stored in memory device 2, and other pertinent information. The current position is continually confirmed, on the basis of coordinate data supplied from current position detection device 3, at predetermined time intervals, and image display device 12 displays the confirmed current position as needed while scrolling the screen as the vehicle moves.

In step S5, CPU 10 determines an instruction to be given (i.e., determines an instruction content) based upon a decided traveling direction in which the vehicle should be moving when it reaches the next intersection. The instruction is determined based upon the current position data, and the route data determined previously in step S3. For example, in step S5, CPU 10 may determine that the next instruction to be given is that the vehicle should be turned to the right when it reaches the next intersection.

After the instruction content is determined in step S5, in step S6, CPU 10 determines whether the instruction content includes an instruction to make a right turn in step S6, or whether the instruction content includes an instruction to make a left turn in step S8. If the instruction content includes an instruction to make a right turn, the process of CPU 10 proceeds to step S7. If the instruction content does not include an instruction to make a right turn, then the process proceeds to step S8, where a determination is made as to whether the instruction content includes an instruction to make a left turn.

When CPU 10 determines that the instruction content includes an instruction to make a right turn at step S6, in step S7, a control signal Q is supplied to control amplifier 6, in order to set the right/left output balance of the respective right and left speakers 7b and 7a as they should be set when a right turn instruction is to be given. More particularly, the right speaker is driven to have a high level tone volume and the left loudspeaker is driven to have a low level tone volume.

On the other hand, when the instruction content includes a left turn instruction as determined at step S8, in step S9, CPU 10 supplies to control amplifier 6 a control signal Q to set the right/left output balance to have an output state corresponding to a left turn instruction. Thus, the control amplifier 6 adjusts the right/left balance of the respective speakers 7b and 7a so that the right loudspeaker is driven to have a low level tone volume, and the left loudspeaker is driven to have a high level tone volume.

When the instruction content includes neither an instruction to make a left turn nor an instruction to make a right turn, CPU 10 proceeds to step S10, where control amplifier 6 is supplied by CPU 10 with a control signal Q for setting an output state corresponding to a straight traveling instruction or another appropriate guidance instruction. Thus, in step S10, control amplifier 6 adjusts the right/left balance of the speakers so that the tone volume level of a voice signal to be output to right loudspeaker 7b is equal to that of the voice signal to be output by left loudspeaker 7a.

Subsequent to setting the levels of the loudspeakers, in either of steps S7, S9, and S10, a determination is made by CPU 10 at step S11 as to whether or not the vehicle has reached the intersection at which the instruction voice determined at step S5 is to be output. This determination is made based upon the coordinate data, and other pertinent information, forwarded from current position detection device 3.

If it is determined at step S11, that the current position of the vehicle has reached the intersection at which the voice instruction should be output by the speakers, CPU 10 will proceed to step S12, and the image instruction signal is output to image display device 12, and the voice synthesis instruction signal is output to voice synthesis device 5.

Upon receipt of the instruction signal, outputted from CPU 10 at step S12, step S13 will be performed. In step 13, voice synthesis device 5 will load the appropriate words, clauses, and the like, corresponding to the instruction signal to be outputted, from its semiconductor memory, and will edit the loaded data in accordance with a predetermined program to synthesize the appropriate words in the form of a predetermined instruction voice (e.g., "turn to the right at the next intersection"). The synthesized voice signal is supplied to the control amplifier 6, which forwards the appropriate signals to the speakers.

The received voice signal is divided by control amplifier 6 into signals for the two respective lines corresponding to the right and left loudspeaker 7b and 7a. Control amplifier 6 has already set the right/left tone volume balance in the processing steps of S7, S9, or S10. Thus, for example, in step S14 when the instruction content includes a right turn instruction, an instruction voice to turn right is output in a high level tone volume from right loudspeaker 7b and the instruction voice to turn right is output in a low level tone volume from left loudspeaker 7a.

The driver will thus hear instructions to take right turns (e.g., "turn to the right at the next intersection) coming predominantly from the right side, and the driver will hear instructions to take left turns (e.g., "turn to the left at the next intersection") coming predominantly from the left side. The louder voice output will be to the right of the driver for a turn right instruction, and the louder voice output will be to the left of the driver for turn left instruction. When an instruction content includes an instruction that does not concern turning to the left or to the right, and includes, e.g., a straight traveling instruction, the driver will hear an instruction "go straight on the next intersection" in a central manner. That is, the volume levels of the left and right speakers will be equal.

It is noted that a straight instruction is issued when CPU 10 determines that the route of the vehicle need not be changed at the next intersection. A voice output (e.g., indicating a straight instruction) need not be generated for every intersection that is approached by the vehicle, but need only be generated when the intersection is a principle intersection. CPU 10 not only outputs information regarding the direction to be taken at a particular intersection, but further outputs other information concerning guidance of the vehicle including, e.g., the distance from the vehicle to its intended destination. Such information is required for route navigation as well.

In order to control the output states of each of the loudspeakers 7b and 7a in step S7 or step S9, a difference between the tone volume levels of the right and left loudspeaker 7b and 7a is set to be large enough so that the driver will sense a significant difference in the voiced instruction's volume level for the sound coming from either the left or right side. When the right and left loudspeakers 7b and 7a are not arranged at equal distances from the driver, the ratio between the right and left speaker volume levels must be set accordingly, so that the total perception of the driver is taken into account. For example, this may occur when the right and left loudspeakers 7b and 7a are respectively mounted on the right and left doors of a vehicle which has a steering wheel positioned at the right side of the vehicle. In this case, the driver's ears are closer to the right loudspeaker side 7b than they are to the left loudspeaker 7a. When a left turn instruction voice is to be output, the volume level of the left loudspeaker 7a is set to be significantly larger than that of the right loudspeaker 7b. When an instruction content includes an instruction which is neither a left turn nor a right turn instruction (e.g., to continue straight), the volume level of the left loudspeaker 7a is set to be slightly larger than that of the right loudspeaker 7b, so that the sounded instruction is perceived by the driver to be of equal volume level from the right and left directions.

Once the voice is outputted at step S14, CPU 10 proceeds to check at step S15 if the destination stored in RAM 9 coincides with the current position of the vehicle. If the destination stored in RAM 9 does not coincide with the current position, i.e., if the vehicle has not reached its intended destination, CPU 10 will return to step S5 to repeat the processing steps pertaining to navigating through a next upcoming intersection. On the other hand, if it is determined at step S15 that the current position coincides with the intended destination, all of the processing operations will end.

As described above, in the voice navigation apparatus according to the first embodiment, the volume levels of the right and left loudspeakers are controlled in accordance with the instruction content of the route navigation instruction, so that the instruction direction (e.g., a left turn direction or a right turn direction) coincides with the direction from which the sound of the instruction voice is perceived to be coming from. This allows the driver to be able to perceive the instruction and understand the instruction based upon the driver's perception of which direction the instruction voice is coming. The driver can thus more readily recognize the content of the instruction.

Several variations may be made by one of ordinary in the art to the above-described voice navigation apparatus of the present invention. For example, in the first embodiment, a voiced instruction may be output only once before the immediate intersection. Alternatively, a voice instruction may be output two or more times; for example, an initial voice instruction may be output at a position which is a predetermined distance (e.g., 300 m) before the intersection, and a later voice instruction may be output when the vehicle is located immediately before the intersection.

As disclosed above, the right/left tone volume balance, controlled by control amplifier 6, is adjusted based upon a control signal output from CPU 10 which is located within arithmetic processing device 4. In the alternative, a discrimination circuit may be provided for discriminating the content of an instruction from CPU 10. Such a discrimination circuit may be provided in addition to CPU 10, and may make the decisions of steps S6–S10 as illustrated in FIG. 2. In such a case, a control signal corresponding to the decision results of steps S6–S10 would be supplied by such a discrimination circuit, in order to direct the control of the right/left tone volume balance by control amplifier 6.

In the first embodiment, the tone volume of one of the right and left loudspeakers may be set to a high volume level, and the other loudspeaker may be set to a low volume level, so that a driver can hear an instruction voice from one direction. The tone volume of the lower volume loudspeaker may be set to 0. More specifically, when an instruction includes a right-turn instruction, the right speaker may be set and the left may be set, so that the right loudspeaker 7b outputs a loud voice, while the left loudspeaker 7a outputs no voice at all. Similarly, when an instruction indicating a left-turn direction is given, a loud voice may be output only from the left loudspeaker 7a, while the right loudspeaker 7b outputs no voice at all.

Figure 3:
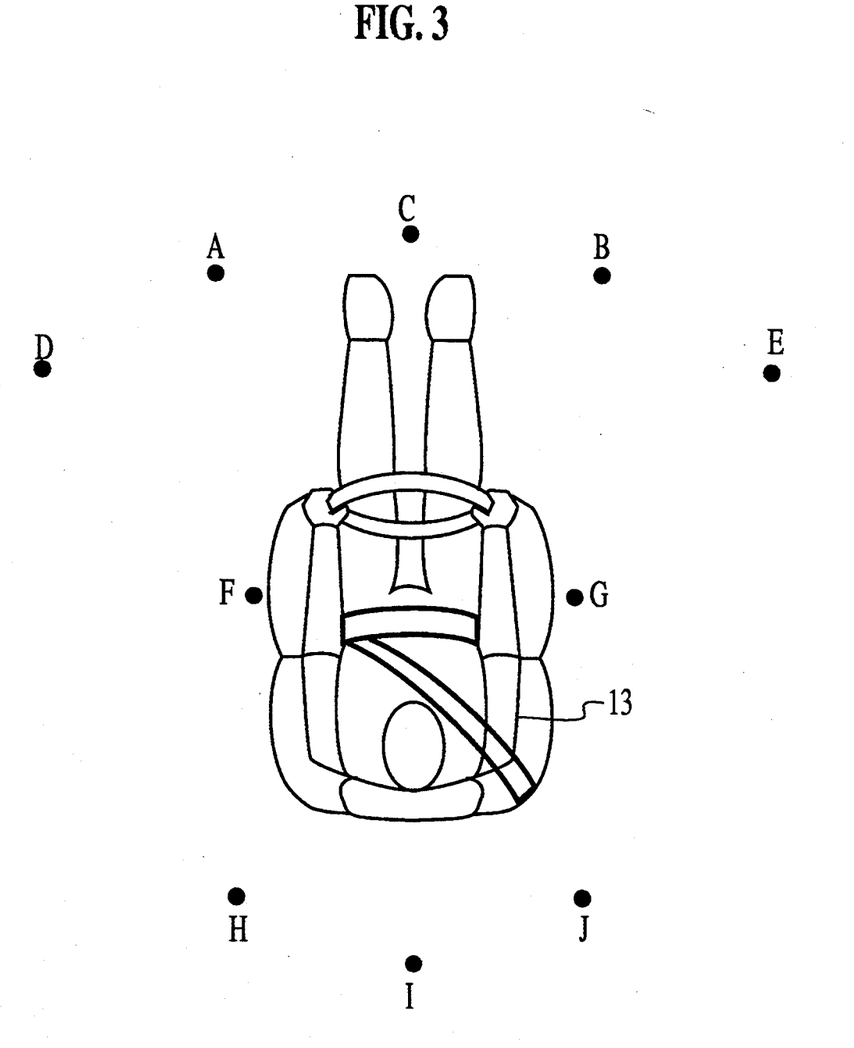
FIG. 3 illustrates an explanatory view of the positional relationship between a driver and an acoustic image formed by an instruction voiced by a voice navigation apparatus according to a second embodiment of the present invention.

A second embodiment voice navigation apparatus may be provided as described below. In the first embodiment apparatus described above, a volume level balance is controlled between right and left loudspeakers, so that an instruction direction coincides with the output direction of the instruction voice. However, in the second embodiment, the tone volume level balance is not only adjusted between left and right sides, but also the phases of voices in units of the right and left loudspeakers are changed to create an acoustic image orientation (i.e., a perceived acoustic pattern), so that the driver perceives that an instruction is coming from a predetermined position. As shown in FIG. 3, when an acoustic image of an instruction is oriented at positions indicated by points A and B (obliquely forward) with respect to a driver 13, a navigation instruction to proceed in an obliquely forward direction (e.g., when a route is branched in two ways at a Y-shaped intersection) can be issued.

When a straight traveling direction instruction is to be issued, the position of an acoustic image is oriented at the position of a point C. When a voice is output that represents an instruction other than an instruction to turn or change direction, e.g., a guidance instruction is given regarding the distance remaining to the destination, a dispersed voice, not having any particular orientation, may be output.

In addition, by way of example, when a right or left turn instruction is issued twice, once at a position 300 m before the vehicle arrives at the intersection, and again at a position immediately before the vehicle arrives at the intersection, the position of an acoustic image may be changed from a point D to a point F, or from a point E to a point G, in accordance with the difference in distance between the vehicle and the intersection, depending upon whether the instruction is for a right or a left turn. More particularly, when a left turn is instructed, and the distance to the intersection is 300 m, a driver will hear an instruction voice from a far position at point D, and when a position is immediately before the intersection, the driver will hear an instruction voice from the closer position at F. Similarly, when the turn instruction is to the right, and when a distance to the intersection is still 300 m, the driver will hear an instruction voice from a far position at point E, and when the position is immediately before the intersection, the driver will hear the instruction voice from the closer position at G. This allows a driver to perceive the change in distance as the vehicle is approaching the intersection.

An additional variation that can be added to give the driver a perception of approaching an intersection is to make the tone volume level for the acoustic image at the closer points F or G higher than the tone volume level for the acoustic image at the farther points D or E, so that a voice instruction will change in loudness and will become louder as the vehicle approaches the intersection. This will allow the driver to more quickly perceive the direction of the instruction given by the voice navigation apparatus.

In each of the first and second embodiments described, two, i.e., right and left, loudspeakers are arranged in the form of a voice output unit. Alternatively, four or more loudspeakers may be used. In such a case, CPU 10 (illustrated in FIG. 1) may be configured to control voice signals corresponding to respective loudspeakers in accordance with their mounting positions, so that not only instructions in the right and left directions may be given, but also instructions may be given in relation to back and forward directions and in up and down directions. More specifically, if four loudspeakers are provided, in the form of two front loudspeakers and two rear loudspeakers, when a backward instruction is to be issued (e.g., a U-turn instruction is to be issued when a vehicle passes an intersection or an appropriate place to turn), the tone volume level of a voice output from the front two loudspeakers will be set lower than the tone volume level of the voice output from the two rear loudspeakers, so that the driver will hear an instruction voice predominantly coming from his or her back side.

In this case, when the orientation of the acoustic image is controlled, in accordance with the pattern illustrated in FIG. 3, the acoustic image may be oriented to a position corresponding to one of the points H, I, and J, so that a further detailed instruction or conveyance of information (e.g., an instruction to move the vehicle in a direction obliquely right and backward) may be generated.

In the above-described embodiments, route information is displayed on image display device 12 to obtain a navigation instruction. However, the present invention can be applied to a voice navigation apparatus that does not comprise any image display device.

In each of the above embodiments, voice synthesis device 5 digitally encodes waveform information of an instruction voice, and stores the digital data in a semiconductor memory using a so-called record/edit system. However, the present invention can also be implemented by providing a voice synthesis device 5 which uses a different type of record/edit system in which waveform information is stored in a CD-ROM provided, e.g., within memory device 2, or in which analog waveform information representing instruction voices is directly recorded on tape, for example by a tape recorder. The present invention may also be applied to a voice synthesis device which adopts another system for synthesizing voice, such as an analysis/synthesis system, which synthesizes a voice based upon a parameter describing a model of the voice generation, a speech synthesis by rule system, which synthesizes a voice in accordance with input signal arrangements that represent optional words or phrases, or the like.

In the above-described embodiments, a direction instruction regarding the direction of the vehicle is issued when there is a change in route, such as when an intersection is approached, or a particular place to turn has been reached, and the voice outputs of the right and left loudspeakers 7b and 7a are controlled in accordance with the contents of the instructions. The voice output and the acoustic image may also be controlled so that the driver perceives voices coming from a predetermined position in accordance with various other non-direction instructions. For example, other instructions, such as a lane change instruction, necessary for route navigation, and instructions concerning the operation of various devices, such as a car audio system, may be issued by a voice.

When a lane change is performed moving the vehicle from a left lane to a right lane, and when such is instructed due to the closing of the current lane caused by a traffic accident, a voice signal such as "Under clearance due to a traffic accident; change to the right lane." may be output in response to detection of an external FM signal. When the voice navigation apparatus detects this external FM signal, it may respond appropriately by instructing a change in lanes. The content of the received FM signal is recognized by a voice recognition device, and the voice signal to be outputted is oriented at a predetermined acoustic image position in accordance with the content of the instruction. Also, an FM signal to be transmitted may also include voice data and acoustic image data indicating the position of an acoustic image corresponding to the content of the voice data.

When an instruction for various device operations is to be generated, for example, an instruction voice stating "lock the rear right door" is output, an acoustic image may be formed so that the driver perceives that the instruction is coming from a position near the rear right door lock of the vehicle.

An additional feature may be provided in order to attract the drivers attention to the voice navigation apparatus. In this regard, a chime tone "pop" may be output before each instruction voice is output, and thereafter, a voice message "turn to the . . . at the next intersection" may be output. In this case, the chime tone may be generated from the same direction as the voice instruction is.

In each of the above-described embodiments, the right/left balance, of respective tone volume levels of the loudspeakers, is controlled by CPU 10 based upon the particular instruction voice given. Alternatively, information associated with the orientation and tone volume level balancing corresponding to each instruction may be set in accordance with a look up table as shown in FIG. 4, and may be stored in a memory (not shown) located within voice synthesis device 5 together with waveform data of the instruction voice.

More specifically, for example, waveform data that represents the words "right direction" for an instruction may be stored in the memory of the voice synthesis device 5 to have a right/left tone volume balance setting, or a phase difference setting, which can orient an acoustic image at a right forward position. With this data, the acoustic image of the instruction voice is oriented to have a position and a tone volume level corresponding to the voice content without the need for CPU 10 to execute a balance control. Since waveform data of an instruction voice can be classified into the sections corresponding to right and left channels, and can be stored in a memory provided within voice synthesis device 5, voice signals from voice synthesis device 5 are supplied to the control amplifier 6 via the two respective right and left speaker lines. In this case, control amplifier 6 serves as a power amplifier.

Figure 4:
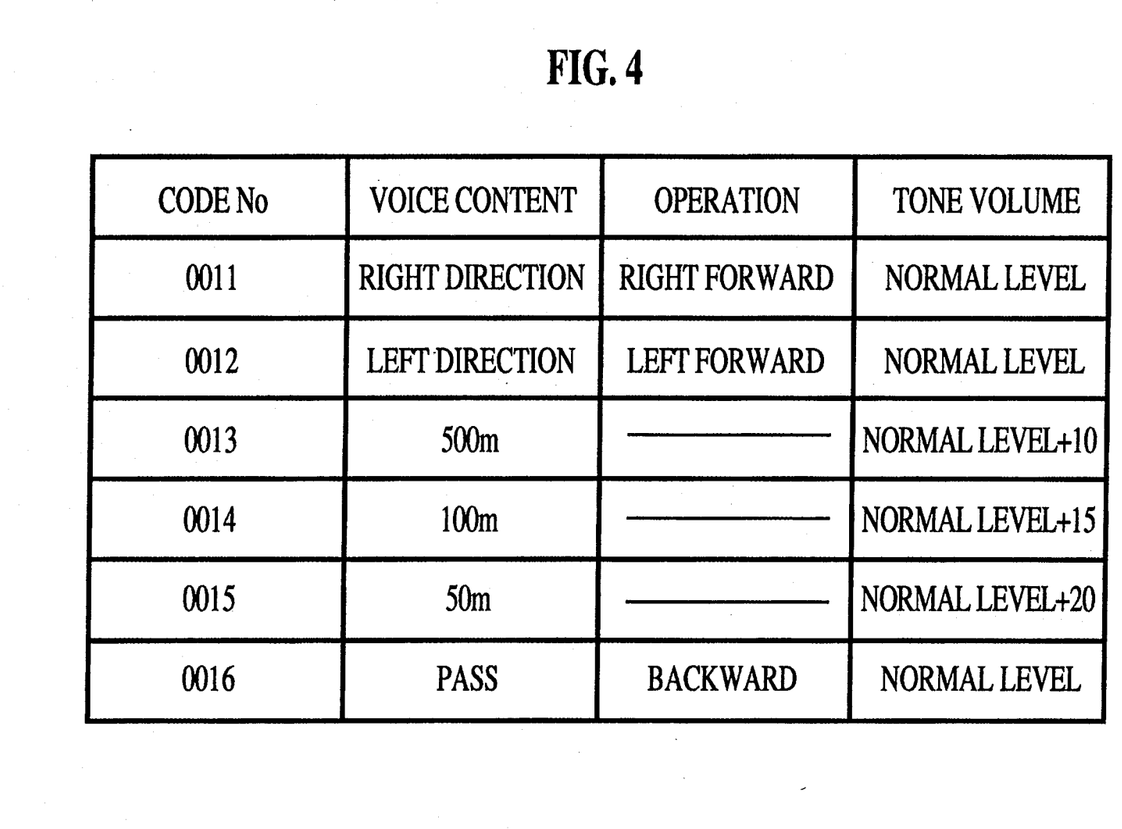
FIG. 4 illustrates an explanatory view of the positional relationship between a driver and an acoustic image formed by an instruction voiced by a modified version of the voice navigation apparatus of the second embodiment of the present invention.

When a travel direction, or a guidance direction instruction is issued for three consecutive times, e.g., when the vehicle is 50 m before a designated intersection, 100 m before the intersection, and 500 m before the intersection, voice data "50 m, 100 m, 500 m" may be stored in the memory of the voice synthesis device 5 to have tone volume levels as shown in FIG. 4. As the vehicle moves from a position at 500 m to a position at 100 m, and then to a position at 500 m from the intersection, the volume of the voice outputted from the speakers will increase, thus causing the driver to perceive that the vehicle is approaching an intersection. In this case, the voice has a volume level of "normal level plus 10", when the vehicle is 500 m before the intersection; the voice has a volume level of "normal level plus 15" when the vehicle is 100 m before the intersection; and the voice has a volume level of "normal plus 20" when the vehicle is 50 m before the intersection.

The guidance information, including the indications that the vehicles is at 500 m, 100 m, and 50 m, is not indicative of the particular direction in which the vehicle will turn. Thus, the volume level balancing setting for the speakers will not be varied (as indicated by the "dash" marks in FIG. 4). That is, the voice will be dispersed throughout the speakers equally.

When the vehicle has passed an intersection at which a turn should have been made, an appropriate instruction voice, stored in the voice memory of devices, is output having a backward orientation with respect to the driver, and the volume level of the speakers is at a "normal level".

The voice data depicted in FIG. 4 may be indexed by code numbers such as "0011" to "0016". When signals corresponding to these code numbers are supplied from CPU 10, corresponding voice data may be synthesized by voice synthesis device 5.

The preferred embodiments of the present application are merely examples, and do not restrict the present invention. Various changes and modifications may be made to the preferred embodiments within the spirit and scope of the claims of the present invention. More specifically, various features within the scope of the present invention as defined by the appended claims, and all related modifications, are included in the present invention.

What is claimed:

1. A navigation apparatus for giving instructions to a driver regarding a route to be taken by a vehicle, said instructions being indicated as an audible sound, said apparatus comprising:

memory means for storing direction data for guiding a driver along a route to be traveled by said vehicle; and sound output means for audibly outputting sound data from data stored by said memory means, so that the resulting sound is perceived by a driver from a direction which coincides with a content of the direction data.

2. An apparatus according to claim 1, further comprising:

sound data selection means for selecting, from said memory means, said sound data to be output by said sound output means, said sound data being selected in accordance with a route to be traveled by the vehicle.

3. A navigation apparatus for giving instructions to a driver regarding a route to be taken by a vehicle, said instructions being indicated as an audible voice, said apparatus comprising:

first memory means for storing various voice data for guiding a driver along a route to be traveled by said vehicle;

voice data selection means for selecting, from said first memory means, voice data according to a route to be traveled; and voice output means for audibly outputting the voice data selected by said voice data selection means, so that a sound of the audibly output voice data is perceived by a driver as coming from a direction which coincides with an instruction content of the selected voice data.

4. An apparatus according to claim 3, further comprising:

current position detection means for detecting a current position of the vehicle;

input means for inputting a destination;

second memory means for storing map data; and route determining means for determining a route that leads to the destination input by said input means on the basis of the current position detected by said current position detection means and the map data stored in said second memory means;

wherein said voice data selection means selects voice data from said first memory means in accordance with the route determined by said route determining means.

5. An apparatus according to claim 4, said voice output means comprising voice output members arranged at a plurality of positions, each of said voice output members outputting a voice message, said voice output means further comprising means for modifying the voice message output by said voice output members, so that a voice message is output at one or more particular positions with respect to a driver of the vehicle in a manner which corresponds to a direction in which the vehicle is being guided.

6. An apparatus according to claim 4, wherein said current position detection means includes at least one of a GPS sensor, a vehicle speed sensor, a geomagnetic sensor, a steering sensor, and a beacon receiver.

7. An apparatus according to claim 4, wherein said voice output means outputs voice data to form an acoustic image that causes a driver of the vehicle to perceive that sound is coming from a particular direction that corresponds to the direction to be taken by the vehicle in continuing along the route of the vehicle.

8. An apparatus according to claim 7, wherein when the content of the selected voice data includes an instruction for the vehicle to change directions along the route, said voice output means outputs voice data in a manner that creates an acoustic image which causes a driver of the vehicle to perceive that sound is coming from a position that corresponds to a direction in which the vehicle is instructed to be driven.

9. An apparatus according to claim 8, wherein said voice output means creates an acoustic image causing the driver to perceive that sound is coming from a position that corresponds to the direction in which the vehicle is instructed to be driven along the route of the vehicle, the perceived position from which the sound is coming from being changed as the vehicle travels, so that the direction from which the sound is perceived to come from and the perceived distance from the perceived sound to the driver change as the vehicle position changes.

10. An apparatus according to claim 9, further comprising:
   vehicle speed detection means for detecting a speed of the vehicle; and
   direction detection means for detecting a direction in which the vehicle is being navigated;
   wherein said voice output means creates an acoustic image based upon the voice data in accordance with the vehicle speed detected by said vehicle speed detection means, and further in accordance with the direction detected by said direction detection means.

11. An apparatus according to claim 10, wherein said direction detection means comprising a steering sensor.

12. An apparatus according to claim 11, wherein said direction detection means comprises means for detecting the direction in which the vehicle is moving based upon a steering amount of the vehicle as detected by said steering sensor, and further based upon a relative angle at which the vehicle is moving with respect to a direction in which the vehicle was traveling before the vehicle has changed its direction.

13. An apparatus according to claim 3, said voice output means comprising voice output members arranged at a plurality of positions, each of said voice output members outputting a voice message, said voice output means further comprising means for modifying the voice message output by said voice output members, so that a voice message is output at one or more particular positions with respect to a driver of the vehicle in a manner which corresponds to a direction in which the vehicle is being guided.

14. An apparatus according to claim 3, wherein when the content of the selected voice data includes an instruction to change a route of said vehicle, said voice output means audibly outputs the voice data when said vehicle is at a position which is a predetermined distance before reaching a location at which the direction of movement of the vehicle is to be changed.

15. An apparatus according to claim 14, wherein said voice output means outputs voice data corresponding to a route to be traveled a plurality of times for each instruction given by said navigation apparatus.

16. An apparatus according to claim 3, wherein said voice output means outputs voice data to form an acoustic image that causes a driver of the vehicle to perceive that sound is coming from a particular direction that corresponds to the direction to be taken by the vehicle in continuing along the route of the vehicle.

17. An apparatus according to claim 3, wherein said voice output means outputs a tone to attract a driver's attention before each time voice data is audibly output.

18. An apparatus according to claim 3, wherein said voice output means outputs a chime tone to attract a driver's attention before each time voice data is audibly output.

19. A voice-type navigation apparatus for providing instructions to a driver of a vehicle, said instructions including audible utterances of directions to the driver regarding a direction in which the vehicle should be driven when the vehicle reaches a next reference location, said navigation apparatus comprising:
   memory means for storing data representative of voice utterances of direction instructions;
   selection means for selecting various words from the voice utterances stored in said memory means in accordance with a direction in which said vehicle should be driven by a driver of said vehicle when said vehicle reaches the next reference location; and
   voice output means for audibly outputting one or more of said words selected by said selection means, said voice output means audibly outputting said one or more words at one or more perceived locations with respect to the driver, said one or more perceived locations being chosen and arranged as a function of the direction given by the selected words.

* * * * *